(12) United States Patent
Ben-Haim et al.

(10) Patent No.: US 8,825,575 B2
(45) Date of Patent: Sep. 2, 2014

(54) CONJUNCTIVE NORMAL FORM ENCODING OF CARDINALITY CONSTRAINTS

(75) Inventors: Yael Ben-Haim, Haifa (IL); Alexander Ivrii, Haifa (IL); Arie Matsliah, Haifa (IL); Oded Margalit, Rama Gan, IL (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 13/487,279

(22) Filed: Jun. 4, 2012

(65) Prior Publication Data

US 2013/0325778 A1 Dec. 5, 2013

(51) Int. Cl.
*G06N 5/00* (2006.01)
*G06N 5/02* (2006.01)
(52) U.S. Cl.
CPC ........................................ *G06N 5/02* (2013.01)
USPC ................................................ 706/45; 703/2
(58) Field of Classification Search
None
See application file for complete search history.

(56) References Cited

U.S. PATENT DOCUMENTS

2009/0125766 A1* 5/2009 Safarpour et al. ............ 714/724

OTHER PUBLICATIONS

Magnus Bjork, "Successful SAT Encoding Techniques", Jul. 25, 2009.
Frisch and Giannaros, "Sat Encodings of the At-Most-k Constraints", The 9th International Workshop on Constraint Modelling and Reformulation, 2010.
As'in et al., "Cardinality Networks: a Theoretical and Empirical Study", ACM, Journal Constraints vol. 16, Issue 2, Apr. 2011.
Marques-Silva et al., "Towards Robust CNF Encodings of Cardinality Constraints", ACM, CP'07 Proceedings of the 13th international conference on Principles and practice of constraint programming, 2007.
As'in et al., "Cardinality networks and their applications", In SAT, pp. 167-180, 2009.
Jingchao Chen, "A new SAT encoding of the at-most-one constraint", In ModREF, 2010.
E'en and Sorensson, "Translating Pseudo-Boolean Constraints into SAT", Journal on Satisability, Boolean Modeling and Computation 2, pp. 1-26, 2006.
Kim Kyung-Mi, "Perfect hash families: Constructions and applications", In Thesis, 2003.
Carsten Sinz, "Towards an optimal CNF encoding of boolean cardinality constraints" In CP, pp. 827-831, 2005.

* cited by examiner

*Primary Examiner* — Alan Chen
(74) *Attorney, Agent, or Firm* — Ziv Glazberg

(57) ABSTRACT

A method, apparatus and product for encoding a cardinality constraint in Conjunctive Normal Form (CNF). The method comprising: having a Boolean formula comprising a cardinality constraint, wherein the cardinality constraint relating to a set of Boolean variables, the set of variables consisting of N variables, the cardinality constraint given in a non-Conjunctive Normal Form; and encoding the cardinality constraint in Conjunctive Normal Form based on a mapping by a Perfect Hash Family, whereby said memory is modified to retain the CNF encoded cardinality constraint.

24 Claims, 2 Drawing Sheets

CONJUNCTIVE NORMAL FORM ENCODING OF CARDINALITY CONSTRAINTS

TECHNICAL FIELD

The present disclosure relates to Conjunctive Normal Form (CNF) encoding in general, and to encoding of cardinality constrains in CNF, in particular.

BACKGROUND

Cardinality constraints arise naturally in many application fields, such as artificial intelligence, operational research, formal verification, combinatorial optimization, constraint programming, error localization and more. One ubiquitous example is encoding of multi-valued variables into propositional form: given a multi-valued variable V with possible domain values $V_1, \ldots, V_n$, usually one introduces auxiliary Boolean (indicator) variables $b_1, \ldots, b_n$, so that each $b_k$ is true if and only if ($V=V_k$), and one adds the "exactly one" constraint on the variables $b_1, \ldots, b_n$ (to enforce V taking exactly one value). Such constraints are natural for example in the translation of constraint satisfaction problems into SAT problems.

A Boolean formula may be represented in Conjunctive Normal Form (CNF). A formula is said to be in CNF if it is a conjunction of clauses, where a clause is a disjunction of literals.

CNF encodings are often used for modern Boolean Satisfiability Problem (SAT) solvers for finding solutions to the more general problems. The state-of-the-art SAT solvers have been highly optimized over the years, and they perform quite well on many CNF formulas arising from practical problems. Their runtime, however, is still (generally) quite sensitive to the number of variables and clauses in the given formula.

BRIEF SUMMARY OF THE INVENTION

One exemplary embodiment of the disclosed subject matter is a computer-implemented method performed by a computer having a processor and memory, comprising: having a Boolean formula comprising a cardinality constraint, wherein the cardinality constraint relating to a set of Boolean variables, the set of variables consisting of N variables, the cardinality constraint given in a non-Conjunctive Normal Form; and encoding the cardinality constraint in Conjunctive Normal Form based on a mapping by a Perfect Hash Family.

Another exemplary embodiment of the disclosed subject matter is a computerized apparatus having a processor and a memory unit coupled thereto, the processor being adapted to perform the steps of: having a Boolean formula comprising a cardinality constraint, wherein the cardinality constraint relating to a set of Boolean variables, the set of variables consisting of N variables, the cardinality constraint given in a non-Conjunctive Normal Form; and encoding the cardinality constraint in Conjunctive Normal Form based on a mapping by a Perfect Hash Family.

Yet another exemplary embodiment of the disclosed subject matter is a computer program product comprising: a non-transitory computer readable medium retaining program instructions, which instructions when read by a processor, case the processor to performs the method comprising: having a Boolean formula comprising a cardinality constraint, wherein the cardinality constraint relating to a set of Boolean variables, the set of variables consisting of N variables, the cardinality constraint given in a non-Conjunctive Normal Form; and encoding the cardinality constraint in Conjunctive Normal Form based on a mapping by a Perfect Hash Family.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
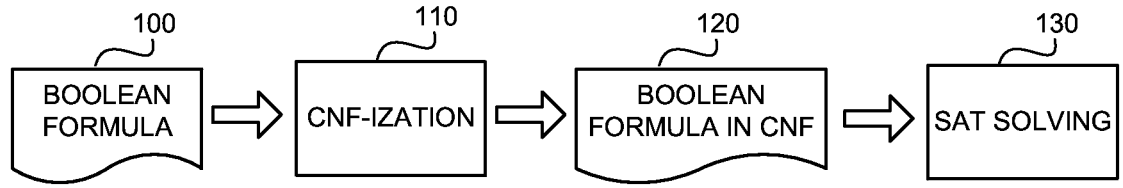
FIG. 1 shows a computerized environment, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A cardinality constraint expresses a numerical bound on discrete quantities. For example, "at least one bit of a set of bits being turned on", "no more than k bits are turned off", "exactly k number of bits are turned on" are all forms of cardinality constraints.

Let $X = X_1, \ldots, X_n$ denote a set of Boolean variables. Given an assignment $x = x_1, \ldots, x_n \in \{0,1\}_n$ to X, $|x|$ denotes the cardinality of the set $\{j: x_j = 1\}$ which is $\Sigma_{j=1}^n x_j$. A constraint relating to the cardinality of x may be referred to as a cardinality constraint. Some exemplary cardinality constraints may be: $|x| \geq 1$ (i.e., at least one variable is assigned the value one), $(n-|x|) \geq 1$ (i.e., at least one variable is assigned the value zero), $|x| \leq k$ (i.e., no more than k variables are assigned one), or the like.

One technical problem is to encode cardinality constraints in CNF. The CNF formula may be utilized by a SAT solver and therefore an efficient encoding is desired. Runtime of state-of-the-art SAT solvers is generally sensitive to the number of variables and clauses in the given formula, and therefore the efficiency of the encoding may be examined with respect to these factors.

Another technical problem is to encode the cardinality constraint in CNF so as desired properties useful for SAT solving are exhibited in the CNF.

One property may be Arc-Consistency (AC). AC property states that for any partial assignment that cannot be extended to an assignment that would satisfy the cardinality constraint, the partial assignment with Unit Propagation (UP) leads to a contradiction.

UP is a propagation technique for deducing values in CNF formulas. a UP is a determination of a value of a Boolean variable based on a CNF for which all literals are falsified except for one literal for which value was not yet assigned. Based on the clause, UP may be used to determine the only valid value of a Boolean variable associated with the literal. As an example, given a clause $(l_1 \vee l'_2 \vee l'_3)$, and a partial assignment $v_1 = \text{false}, v_3 = \text{true}$, it can be inferred that the clause can only be satisfied in case $v_2 = \text{false}$. UP deduces such an assignment.

Another property may be a stronger arc-consistency (AC+). AC+ property states that if a partial assignment has only one possible extension that satisfies the cardinality constraint, then the extension it is obtainable using one or more UP.

One technical solution is to encode the CNF based on a Perfect Hash Family (PHF). A PHF-based encoding may be performed by determining a set of reduced cardinality constraints which provide the same constraint with respect to a smaller set of Boolean variables than that in the original cardinality constraint, and utilizing hash functions of the PHF to map between Boolean variables of the original cardinality constraint to the smaller sets of the reduced cardinality constraint.

As an example only, consider a cardinality constraint of an at-most-k constraint with respect to N Boolean variables (N>k). In other words, the cardinality constraint verifies that no more than k Boolean variables hold a predetermined characteristic, such as being true (i.e., set to one). In some exemplary embodiments, the disclosed subject matter suggests determining a set of reduced cardinality constraints. The reduced cardinality constraints are "reduced" in the sense that they refer to a reduced number of Boolean variables R (N>R). The reduced number of Boolean variables may be larger than k (R>k) to allow a situation in which the cardinality constraint is violated. Based on the outcome of the set of reduced cardinality constraints, the outcome of cardinality constraint can be determined.

The reduced cardinality constraints may be encoded in CNF using any encoding method known in the art, including, but not limited to naïve CNF encoding, unary-counter counter based encoding, binary-counter based encoding, product encoding, commander encoding, or the like, such as described in Carsten Sinz, Towards an Optimal CNF Encoding of Boolean Cardinality Constraints, In $11^{th}$ Int. Conf. on Principles and Practice of Constraint Prog., 2005 and in Alan Frisch et al., SAT Encodings of the At-most-k Constraint, In ModREF, 2010, both are hereby incorporated by reference. Therefore, encoding the cardinality constraint in CNF involves determining a number of "smaller" cardinality constraints and encoding them in CNF. It will be noted that as efficiency, in terms of number of clauses and auxiliary variables, generally depends upon the size of the cardinality constraint, encoding the reduced cardinality constraints generally requires a smaller number of clauses and/or Boolean variables than encoding the cardinality constraint itself (using the same CNF encoding method) and may therefore be considered more efficient.

A mapping between the cardinality constraint and the reduced cardinality constraints is used to determine the outcome of the cardinality constraint. The mapping may be based on the PHF in such a manner that ensures that if any of the subsets of the N Boolean variables of a size R violate the at-most-k constraint at least one reduced cardinality constraint is violated. Based on any violation of a reduced cardinality constraint, the cardinality constraint is determined to be violated as well. In some exemplary embodiments, each reduced cardinality constraints are applied on different R auxiliary variables. The value of each auxiliary variable may be based on a value of a corresponding variable of the N Boolean variables according to a hashing function of the PHF.

A PHF is a set of hash functions, as is known in the art. A hash function is a function h which maps between a larger set of values to a smaller set of values. As an example, a hash function h may map between N indexes of N Boolean variables to R indexes of R auxiliary variables. For simplicity, we denote the set of N indexes as [N] and the set of R indexes as [R]. A hash function is said to be perfect on a subset of [N] if h is injective on the subset. A PHF is generally a set of hash functions that for each subset of [N] of up to a predetermined size, there exists at least on perfect hash function in the PHF.

In some exemplary embodiments, an (n, l, r)-Perfect Hash Family is a perfect hash family consisting of a predetermined number of hash functions (denoted as m), each of which is defined from [n] to [r], where for each subset of [n] of size up to l, there exists a hash function h in the hash family that is a perfect hash function with respect to the subset. In some exemplary embodiments, CNF encoding may be based on an (N, k+1, R)-Perfect Hash Family, where N is the number of Boolean variables participating in the at-most-k cardinality constraint and R is the number of Boolean variables participating in each of the reduced cardinality constraints. In some exemplary embodiments, R may be any arbitrary integer value smaller than N and greater than k. In some exemplary embodiments, R may be about $(k+1)^2$.

In some exemplary embodiments, per each hash function ($h_i$, where i is an index of the hash function) of the PHF being utilized (e.g., (N, k+1, R)-PHF), R new auxiliary Boolean variables are introduced. The new auxiliary variables are denoted as $Y_1^i, \ldots, Y_R^i$. For each Boolean variable $X_j$ of the N Boolean variables, an implication $X_j \to Y_{h_i(j)}^i$ may be encoded in CNF. The implication may be encoded in CNF such as using a binary clause: $(\neg X_j \vee Y_{h_i(j)}^i)$. In some exemplary embodiments, the implication may be an iff (if and only if) implication (i.e., $X_j \leftrightarrow Y_{h_i(j)}^i$) which may be encoded in CNF such as using two binary clauses: $(\neg X_j \vee Y_{h_i(j)}^i)$ and $(X_j \vee \neg Y_{h_i(j)}^i)$.

In some exemplary embodiments, a value of each auxiliary variable $Y_k^i$ may be computed as a disjunction between values of a subset of the N Boolean variables which map to it according to the hash function (e.g., $\{X_j | j = h_i^{-1}(k)\}$). Additionally or alternatively, each auxiliary variable may be defined based on a disjunction between values of said subset of the N Boolean variables, but may have a degree of freedom. For example, each auxiliary variable may be defined as an implication of the disjunction (e.g., $$\bigcup_{j \in h_i^{-1}(k)} X_j \to Y_k^i \Bigr).$$

The clauses encoding the implications together with the CNF encoding of the reduced cardinality constraints provide CNF encoding of the cardinality constraint.

One technical effect is an efficient encoding. In some exemplary embodiments, the encoding may be AC+, such as in case of an AC+ encoding of the reduced cardinality constraints (e.g., unary-counter based encoding). Additionally or alternatively, a number of clauses introduced by the CNF encoding is limited to $m \cdot N + m \cdot O(R \cdot k)$ (e.g., in case of unary-counter based encoding). Additionally or alternatively, a number of auxiliary variables that are added is limited to $m \cdot R + m \cdot O(R \cdot k)$ (e.g., in case of unary-counter based encoding).

In some exemplary embodiments, R may be determined to be about $(k+1)^2$. The encoding may comprise a number of clauses that is limited by $O(N \cdot k \cdot \log N + k^4 \cdot \log N)$ the encoding may introduce a number of auxiliary variables that is limited by $O(k^4 \cdot \log N)$. In some exemplary embodiments, k may be one (1) and R set to two (2). In such a case, the number of clauses may be limited by the function $O(N \cdot \log N)$ and the encoding may introduce a number of auxiliary variables that is limited by the function $O(\log N)$.

Another technical effect of the disclosed subject matter is providing a CNF encoding that have linear (up-to logarithmic factors) number of clauses, and the least number of additional variables, compared to all previous encodings of the same type.

Yet another technical effect of the disclosed subject matter is providing a CNF encoding that can be efficiently solved by a SAT solver.

Referring now to FIG. 1 showing a computerized environment, in accordance with some exemplary embodiments of the disclosed subject matter.

A CNF-ization tool 110, such as implemented in hardware, software, or combination thereof, or the like, is configured to obtain a Boolean Formula 100 given in a non-CNF and encode the Boolean Formula 110 in CNF, thereby determining a Boolean Formula in CNF 120. Boolean Formula 110 may be obtained in a computer-readable form, such as from a computer readable storage, a digital file, as an input from a user, or the like. Boolean Formula in CNF 120 may be provided in a computer-readable form, such as retained in a storage, in a digital file, or the like.

Boolean Formula 100 may be, or may comprise, a cardinality constraint over Boolean variables, such as an at-most-k constraint or an at-most-1 constraint. The Boolean Formula in CNF 120 may be an equivalent formula to Boolean Formula 100 encoded in CNF.

A SAT solving module 130, such as a SAT solver implemented in hardware, software, combination thereof, or the like, may be configured to determine whether or not Boolean Formula in CNF 120 is satisfiable. In some exemplary embodiments, SAT Solving 130 may determine an example of a satisfying assignment. Additionally or alternatively, SAT solving 130 may provide a proof of unsatisfiability and optionally a SAT core.

Figure 2:
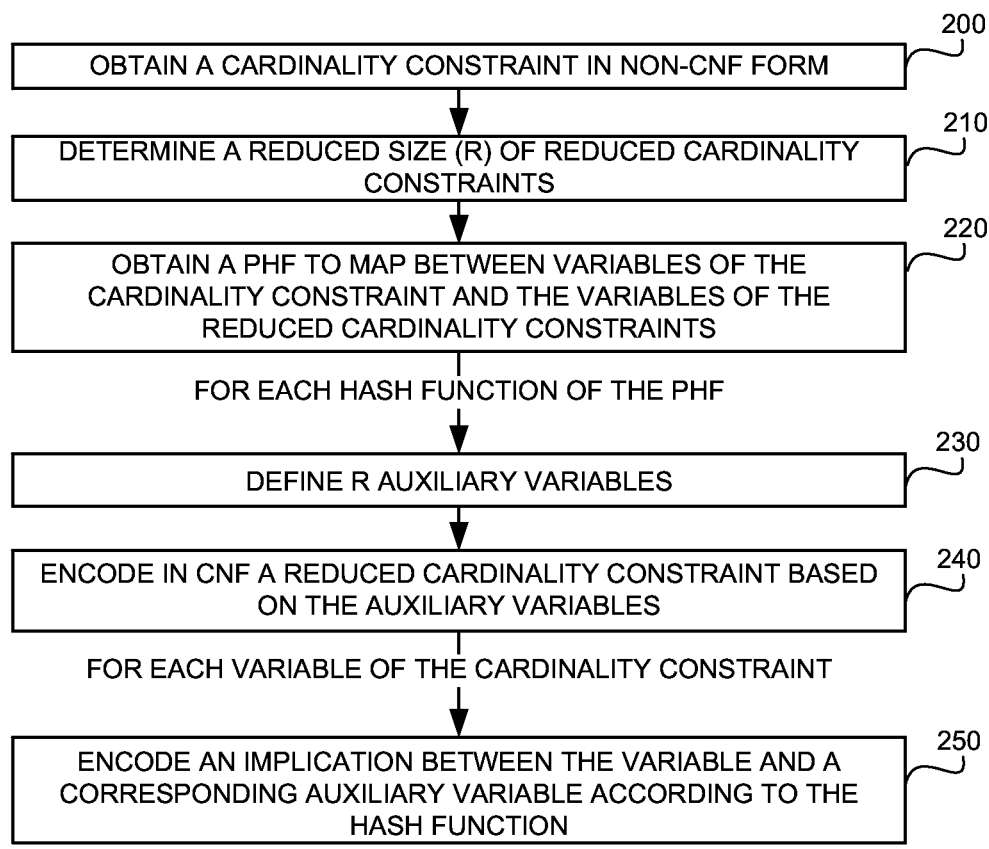
FIG. 2 shows a flowchart diagram of a method of encoding a cardinality constraint, in accordance with some exemplary embodiments of the disclosed subject matter.

Referring now to FIG. 2 showing a flowchart diagram of a method of encoding a cardinality constraint, in accordance with some exemplary embodiments of the disclosed subject matter.

In Step 200, a cardinality constraint may be obtained. The cardinality constraint may be obtained from a computer-readable storage or medium, from a user, or the like. The cardinality constraint may be provided in any form that is not CNF. The cardinality constraint may involve a set of Boolean variables comprising N variables.

In Step 210, a reduced size (R) is determined. The Reduced size R may be smaller than N. The reduced size may be associated with a parameter of the cardinality constraint, such as being greater than the parameter and optionally slightly greater than the parameter. For example, in an at-most-k constraint, the parameter may be k and R may be determined to be greater than k and optionally slightly greater than k, such as k+1.

In Step 220, a PHF may be obtained. The PHF may be characterized in mapping from [N] to [R]. The PHF may an (N, k+1, R)-PHF. The PHF may be obtained from a pre-existing source or may be constructed based on the desired properties. A size of the PHF (i.e., number of hash functions (m)) may depend upon the parameters of the PHF. The PHF may be utilized to map between variables of the cardinality constraint to variables of reduced cardinality constraints.

Steps 230-250 may be performed iteratively with respect to each hash function of the PHF (i.e., m times).

In Step 230, R auxiliary variables may be defined (i.e., $Y_1^i, \ldots, Y_R^i$, where i is an index of the hash function). The auxiliary variables may be Boolean variables.

In Step 240, a reduced cardinality constraint may be encoded with respect to the R auxiliary variables. The reduced cardinality constraint may be substantially equivalent to the cardinality constraint but defined with respect to a smaller number of variables. As an example only, in case the cardinality constraint examines whether at-most-k Boolean variables out of the N variables are turned on, the reduced cardinality constraint may examine whether at-most-k Boolean variables out of the R auxiliary variables are turned on.

The reduced cardinality constraint may be encoded in CNF, such as using any CNF-encoding method. In some exemplary embodiments, the reduced cardinality constraint may be encoded using an unary-counter based encoding.

Step 250 may be performed iteratively with respect to with variable of the cardinality constraint (i.e., N times).

In Step 250, an implication between the variables and a corresponding auxiliary variable may be encoded. The corresponding auxiliary variable may be determined based on a mapping by the hash function (denoted as $h_i$). The implication may be $X_j \to Y_{h_i(j)}^i$, where $X_j$ is the Boolean variable and $Y_{h_i(j)}^i$ is the corresponding auxiliary variable.

Based on the clauses determined in steps 240 and 250, a CNF of the cardinality constraint may be determined such as a conjunction of all the clauses.

Figure 3:
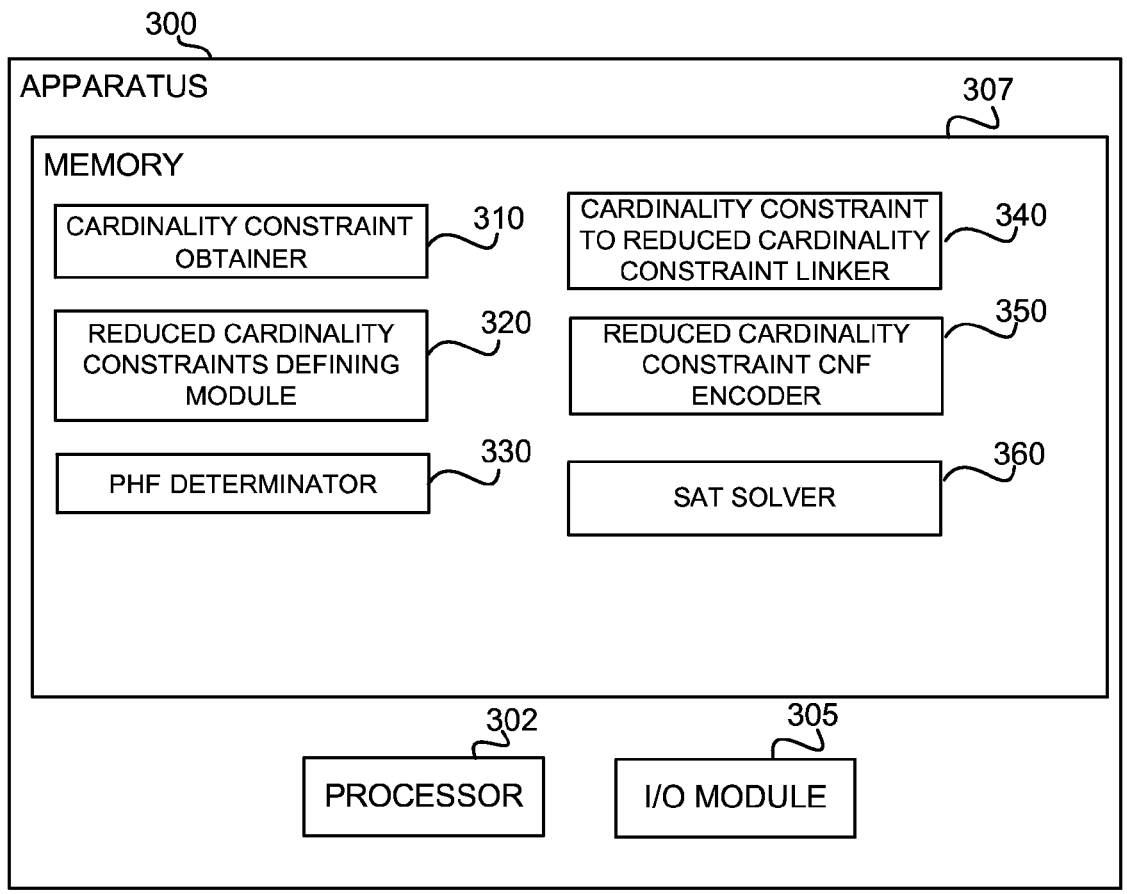
FIG. 3 shows a block diagram of an apparatus, in accordance with some exemplary embodiments of the disclosed subject matter.

Referring now to FIG. 3 showing a block diagram of an apparatus, in accordance with some exemplary embodiments of the disclosed subject matter.

In some exemplary embodiments, an Apparatus 300 may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents. Processor 302 may be configured to execute computer-programs useful in performing the method of FIG. 2 or the like In some exemplary embodiments of the disclosed subject matter, Apparatus 300 may comprise an Input/Output (I/O) Module 305. I/O Module 305 may be utilized to provide an output to and receive input from a user. I/O Module 305 may be operative to provide an error report to a user, and/or obtain information from external sources, such as a user or a computer-readable medium or storage. Additionally or alternatively, I/O Module 305 may enable Apparatus 300 to be operatively coupled with an external tool such as an external SAT solver.

In some exemplary embodiments, Apparatus 300 may comprise a Memory Unit 307. Memory Unit 307 may be a short-term storage device or long-term storage device. Memory Unit 307 may be a persistent storage or volatile storage. Memory Unit 307 may be a disk drive, a Flash disk, a Random Access Memory (RAM), a memory chip, or the like. In some exemplary embodiments, Memory Unit 307 may retain program code operative to cause Processor 302 to perform acts associated with any of the subcomponents of Apparatus 300. In some exemplary embodiments, Memory Unit 307 may retain program code operative to cause Processor 302 to perform acts associated with any of the steps in FIG. 2 above. Memory Unit 307 may retain the Boolean formula representing the cardinality constraint, either in CNF or in non-CNF.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

A Cardinality Constraint Obtainer 310 may be configured to obtain a cardinality constraint, such as performed in Step 200.

A Reduced Cardinality Constraints Defining Module 320 may be configured to determine one or more reduced cardinality constraints of a size R based on the cardinality constraint. In some exemplary embodiments, Reduced Cardinality Constraints Defining Module 320 may be configured to determine the size R. In some exemplary embodiments, Reduced Cardinality Constraints Defining Module 320 may be configured to introduce R auxiliary variables with respect to which a reduced cardinality constraint is defined. Reduced Cardinality Constraints Defining Module 320 may be configured to perform acts such as in Step 210, 230 and 240.

A PHF Determinator 330 may be configured to determine a PHF useful for encoding the cardinality constraint, in accordance with the disclosed subject matter. In some exemplary embodiments, PHF Determinator 330 may perform acts such as in Step 220.

A Cardinality Constraint To Reduced Cardinality Constraint Linker 340 may be configured to link between the cardinality constraint to a reduced cardinality constraint, such as by encoding implications between values of the Boolean variables and values of the auxiliary variables of the reduced cardinality constraint. In some exemplary embodiments, Cardinality Constraint To Reduced Cardinality Constraint Linker 340 may be configured to be based on a mapping by a hash function of the PHF determined by PHF Determinator 330. In some exemplary embodiments, Cardinality Constraint To Reduced Cardinality Constraint Linker 340 may perform acts such as in Step 250.

A Reduced Cardinality Constraint CNF Encoder 350 may be configured to encode a reduced cardinality constraint to CNF formula, such as using a unary-counter based encoding. In some exemplary embodiments, Reduced Cardinality Constraint CNF Encoder 350 may perform acts such as in Step 240.

A SAT Solver 360 may be useful to determine whether or not there is a satisfying assignment to a CNF, such as a CNF comprising a cardinality constraint. In some exemplary embodiments, SAT Solver 360 may be external to Apparatus 300 but operatively coupled thereto, such as using an Application Programming Interface (API) or a similar interface.

Figure 4:
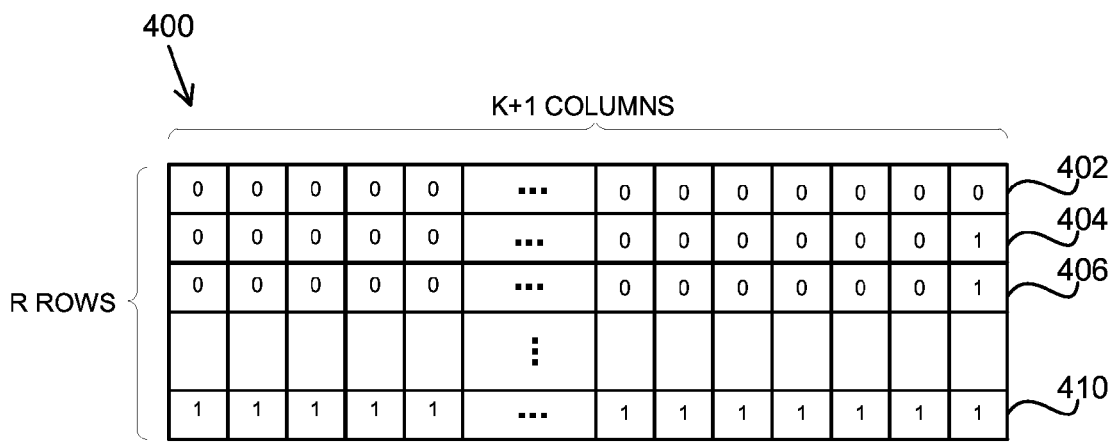
FIG. 4 shows an illustration of a unary-counter, in accordance with some exemplary embodiments.

Referring now to FIG. 4 showing an illustration of a unary-counter, in accordance with some exemplary embodiments.

Table 400 exemplifies a unary-counter useful in a CNF encoding. Table 400 comprises R rows, each of which comprising k columns. Each row counts, using a unary-based counter, a number of variables out of a subset of the R variables that exhibit a desired property relating to the reduced cardinality constraint. As an example, in case of an at-most-k variables are turned on constraint, each row counts how many variables out of the subset are turned on.

Row 410 is a counter counting the number of variables out of all R variables that exhibit the property, therefore based on the value of Row 410 it can be determined directly whether or not the reduced cardinality constraint is satisfied or falsified.

Row 410 is computed based on the value of the R-th variable as well as the value of a predeceasing row (not shown). Each row is computed based on a previous row, which relates to the same subset excluding one variable (i.e., the i-th variable, which is added for the i-th row). Put in other words, Row 402 relates to a first variable only, Row 404 relates to the first and second variables, Row 406 relates to the first three variables, and so forth.

In some exemplary embodiments, unary-counter based encoding is an AC+ encoding, and therefore an encoding of a cardinality constraint in accordance with the disclosed subject matter which provides a set of reduced cardinality constraint, each of which is encoded using unary-counter based encoding, may also exhibit AC+ property.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a computer having a processor and memory, comprising:
   having a Boolean formula comprising a cardinality constraint, wherein the cardinality constraint relating to a set of Boolean variables, the set of variables consisting of N variables, the cardinality constraint given in a non-Conjunctive Normal Form; and
   encoding the cardinality constraint in Conjunctive Normal Form based on a mapping by a Perfect Hash Family;
   whereby said memory is modified to retain the CNF encoded cardinality constraint.

2. The computer-implemented method of claim 1, wherein said encoding comprises:
   encoding a set of reduced cardinality constraints, each reduced cardinality constraint relating to a set of Boolean variables consisting of R variables, where R is smaller than N; and
   mapping the cardinality constraint to each of the set of reduced cardinality using a hash function of the Perfect Hash Family.

3. The computer-implemented method of claim 2, wherein each reduced cardinality constraint is encoded by introducing R auxiliary Boolean variables and encoding the reduced cardinality constraint to relate to the R auxiliary Boolean variables, wherein hash functions of the Perfect Hash Family are defined from [N] to [R].

4. The computer-implemented method of claim 3, wherein said encoding the reduced cardinality constraint to relate to the R auxiliary Boolean variables comprises encoding the reduced cardinality constraint using a unary-counter based encoding.

5. The computer-implemented method of claim 2, wherein said mapping comprises encoding an implication between the set of Boolean variables of the cardinality constraint to a corresponding Boolean variable of the reduced cardinality constraint, wherein the corresponding Boolean variable is determined based on the hash function.

6. The computer-implemented method of claim 2, wherein said encoding comprises:
   for each reduced cardinality constraint to be encoded associated with an index i:
      introducing R auxiliary Boolean variables: $Y_1^i, \ldots, Y_n^i$;
      for each Boolean variable $X_j$ of the set of Boolean variables, encoding an implication $X_j \rightarrow Y_{h_i(j)}^i$, wherein $h_i$ is the hash function associated with the reduced cardinality constraint; and
      encoding the reduced cardinality constraint on the R auxiliary Boolean variables.

7. The computer-implemented method of claim 6, wherein said encoding the implication is performed by adding a clause $(\neg X_j \vee Y_{h_i(j)}^i)$.

8. The computer-implemented method of claim 2,
   wherein the cardinality constraint is an at-most-k constraint; and wherein the Perfect Hash Family is an (N, k+1, R)-Perfect Hash Family.

9. The computer-implemented method of claim 2,
wherein the cardinality constraint is an at-most-k constraint; and
wherein R is greater than k.

10. The computer-implemented method of claim 9, wherein R is about $(k+1)^2$.

11. The computer-implemented method of claim 1, wherein the cardinality constraint is an at-most-k constraint.

12. The computer-implemented method of claim 1,
wherein the cardinality constraint is an at-most-k constraint;
wherein said encoding comprises of a number of clauses that is limited by $O(N \cdot k \cdot \log N + k^4 \cdot \log N)$; and
wherein said encoding comprises introducing a number of auxiliary variables that is limited by $O(k^4 \cdot \log N)$.

13. The computer-implemented method of claim 1,
wherein the cardinality constraint is an at-most-1 constraint;
wherein said encoding comprises of a number of clauses that is limited by the function $O(N \cdot \log N)$; and
wherein said encoding comprises introducing a number of auxiliary variables that is limited by the function $O(\log N)$.

14. The computer-implemented method of claim 1, wherein the cardinality constraint is an at-most-k constraint, and wherein the CNF of cardinality constraint determined by said encoding is characterized in holding a strongest propagation property.

15. The computer-implemented method of claim 1, further comprising utilizing a Boolean satisfiability problem (SAT) solver to solve the Boolean formula given the Boolean formula in Conjunctive Normal Form.

16. The computer-implemented method of claim 1, wherein said encoding comprises storing the constraint in Conjunctive Normal Form in a computerized memory.

17. A computerized apparatus having a processor and a memory unit coupled thereto, the processor being adapted to perform the steps of:
having a Boolean formula comprising a cardinality constraint, wherein the cardinality constraint relating to a set of Boolean variables, the set of variables consisting of N variables, the cardinality constraint given in a non-Conjunctive Normal Form; and
encoding the cardinality constraint in Conjunctive Normal Form based on a mapping by a Perfect Hash Family.

18. The computerized apparatus of claim 17, wherein said encoding comprises:
encoding a set of reduced cardinality constraints, each reduced cardinality constraint relating to a set of Boolean variables consisting of R variables, where R is smaller than N; and
mapping the cardinality constraint to each of the set of reduced cardinality using a hash function of the Perfect Hash Family.

19. The computerized apparatus of claim 18, wherein each reduced cardinality constraint is encoded by introducing R auxiliary Boolean variables and encoding the reduced cardinality constraint to relate to the R auxiliary Boolean variables, wherein hash functions of the Perfect Hash Family are defined from [N] to [R].

20. The computerized apparatus of claim 18,
wherein the cardinality constraint is an at-most-k constraint; and
wherein the Perfect Hash Family is an (N, k+1, R)-Perfect Hash Family.

21. A computer program product comprising:
a non-transitory computer readable medium retaining program instructions, which instructions when read by a processor, case the processor to performs the method comprising:
having a Boolean formula comprising a cardinality constraint, wherein the cardinality constraint relating to a set of Boolean variables, the set of variables consisting of N variables, the cardinality constraint given in a non-Conjunctive Normal Form; and
encoding the cardinality constraint in Conjunctive Normal Form based on a mapping by a Perfect Hash Family.

22. The computer program product of claim 21, wherein said encoding comprises:
encoding a set of reduced cardinality constraints, each reduced cardinality constraint relating to a set of Boolean variables consisting of R variables, where R is smaller than N; and
mapping the cardinality constraint to each of the set of reduced cardinality using a hash function of the Perfect Hash Family.

23. The computer program product of claim 22, wherein each reduced cardinality constraint is encoded by introducing R auxiliary Boolean variables and encoding the reduced cardinality constraint to relate to the R auxiliary Boolean variables, wherein hash functions of the Perfect Hash Family are defined from [N] to [R].

24. The computer program product of claim 21,
wherein the cardinality constraint is an at-most-k constraint; and
wherein the Perfect Hash Family is an (N, k+1, R)-Perfect Hash Family.

* * * * *